United States Patent Office 3,431,891
Patented Mar. 11, 1969

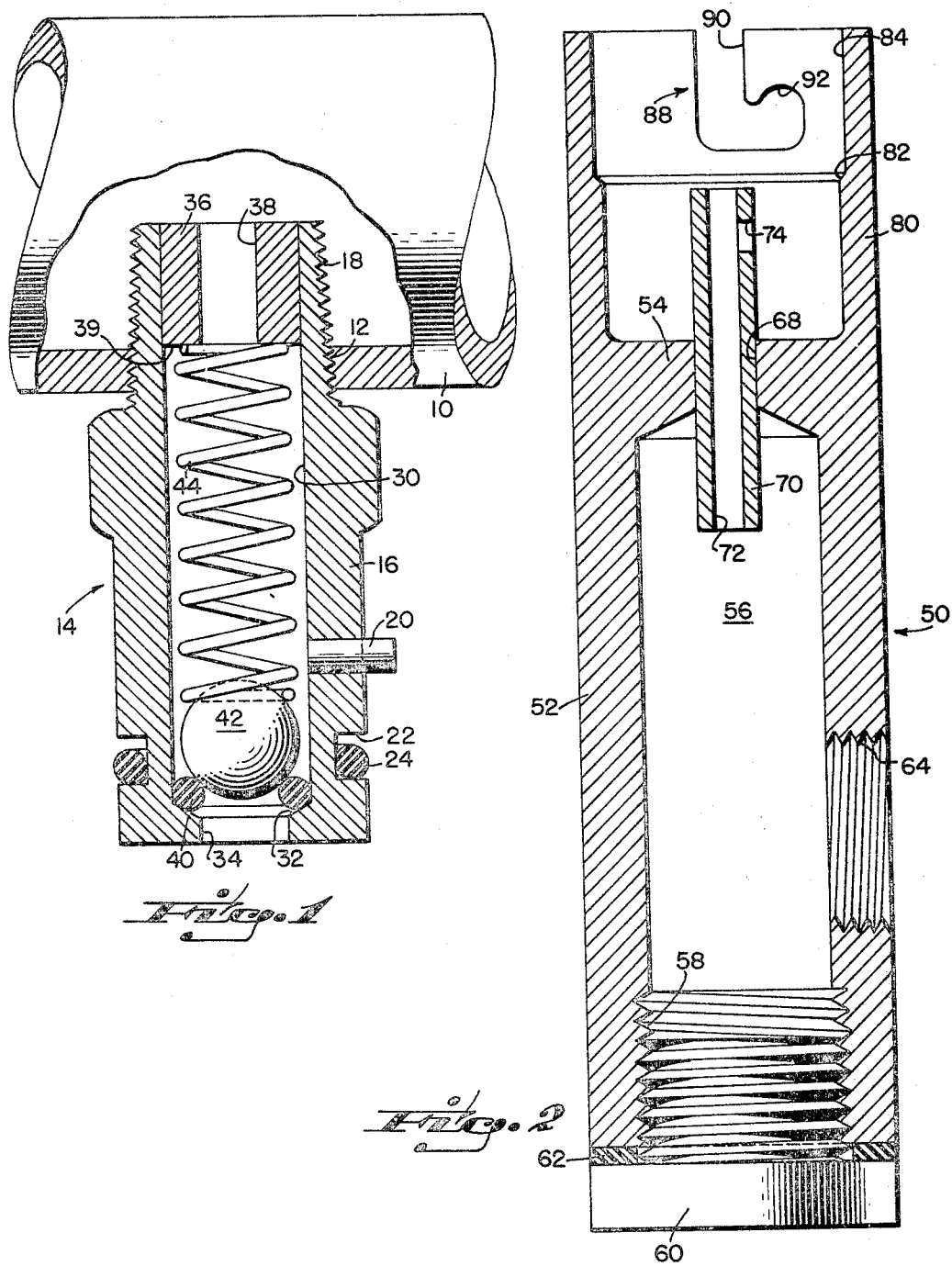

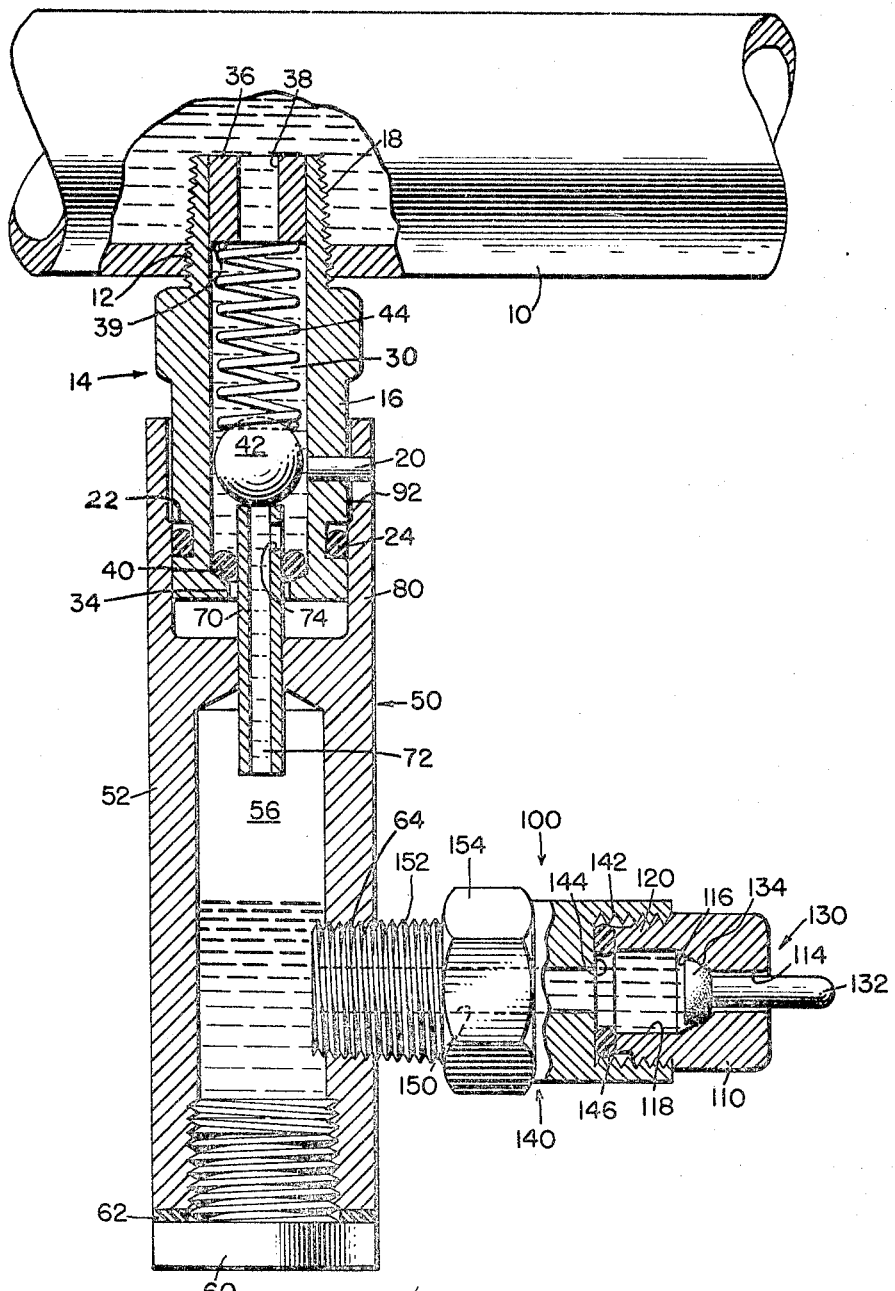

3,431,891
RESEARCH ANIMAL WATERING APPARATUS
Charles P. Boegli, Woodlawn, and Delbert Steigerwald, Terrace Park, Ohio, assignors to the Fieldstone Corporation, Cincinnati, Ohio, a corporation of Ohio
Filed Jan. 31, 1967, Ser. No. 612,855
U.S. Cl. 119—72.5  8 Claims
Int. Cl. A01k 1/00, 7/00

ABSTRACT OF THE DISCLOSURE

Watering apparatus actuatable by individual animals, and elements thereof including a valved air trap arranged to prevent communication of disease and contaimination amongst caged animals in a battery of cages, the apparatus being easily and quickly serviced without wetting the cage floors and without interrupting the supply of water to cages previously serviced.

---

The present invention relates to a research animal watering apparatus, such as may be used in scientific laboratories wherein are housed batteries of animal cages containing various types of research animals to be used for scientific experimentation.

In supplying drinking water to the many animal cages of a laboratory, it is imperative that the caged animals have available a constant ready supply of fresh filtered water, uncontaiminated by food particles, droppings, and accumulations of harmful bacteria generated in poorly attended watering equipment. Of great importance also is the prevention of transfer of bacteria or disease from one animal to another, through the common watering system supplying the many animal cages of a battery.

One common form of watering system presently employed involves the use of glass bottles mounted in the individual animal cages, and provided with dispensers actuated by the animals when seeking drinking water. The bottles and dispensers require frequent cleaning and refillings by a laboratory attendant, and entail much labor and expensive care. For lack of proper care, the bottles frequently became contaimimated due to entry of food particles and animal saliva siphoned back into the bottles. As a result, the health of some animals was impaired, while others lost weight and vigor due to a refusal to consume a normal quantity of drinking water unpalatable to the animals.

An object of the present invention is to provide improved equipment for supplying potable drinking water automatically, to a multiplicity of caged laboratory animals.

Another object of the invention is to provide equipment of the character stated, which requires a minimum of care and servicing in supplying all the drinking water requirements of caged laboratory animals.

Another object is to provide means in connection with a laboratory animal watering apparatus, which may easily and quickly be cleaned when necessary, without spillage of water tending to produce a wet unhealthful condition of the cage floor.

A further object of the invention is to provide equipment of the character stated, which eliminates the possibility of disease or bacteria transfer amongst laboratory animals, by preventing back-siphonage or cross-contamination of drinking water between the feed nipples exposed to the animals, and the source of fresh water supplying the nipples, through the agency of a novel bacteriological trap forming an element of the invention.

Another object is to provide equipment of the character stated, which includes a quick-disconnect bacteriological trap associated with a check valve and manifold supplying fresh water to the food nipple, whereby the trap and nipple structure may quickly and easily be removed for cleaning or replacement, without loss or spillage of water and without disabling other trap and nipple structures incorporated in the watering system.

Another object is to provide a water feeding apparatus for laboratory cage animal, which is adapted for easy and thorough cleaning and sterilization both internally and externally, to ensure a constantly available supply of uncontaminated water for consumption by laboratory animals.

The foregoing and other objects are attained by the means described herein and illustrated upon the accompanying drawings, in which:

FIG. 1 is an enlarged view in vertical section and partly broken away illustrating a quick-disconnect check valve according to the present invention;

FIG. 2 is a vertical section through a bacteriological trap according to the present invention; and FIG. 3 illustrates the assembly of the apparatus shown in FIGS. 1 and 2 in association with an animal watering valve.

Referring now to the drawings wherein like reference characters designate corresponding parts throughout the several views, there is shown in FIG. 1 a manifold pipe 10 which may be connected with any suitable number of quick-disconnect check valves or other outlets, and which serves as a common source of drinking water under pressure up to 15 p.s.i., to be delivered to a plurality of animal cages.

A threaded opening 12 is provided in the wall of manifold pipe 10, and a quick-disconnect check valve according to the present invention is indicated generally by reference numeral 14. This valve structure includes an elongate body 16 having a threaded upper end portion 18 which is threaded within the opening 12 in the manifold pipe.

A groove 22 extends circuferentially around the outer surface of the valve body, and receives a sealing means 24 in the form of an O-ring formed of rubber or a similar suitable sealing material. This sealing means is adapted to engage the inner surface of a cooperating portion on the bacteriological trap for providing a liquid seal therewith as hereinafter described.

Valve body 16 has a bore 30 extending longitudinally therethrough, the bore opening at the upper end of the body. A bushing 36 is suitably secured, as by a press-fit, within the upper end of the bore 30 in the body. Bushing 36 has a bore 38 extending centrally therethrough, to proivde a water entry port.

At its lower end, bore 30 may be reduced in diameter to present an annular valve seat 32, and an adjacent water outlet port 34 of lesser diameter than bore 30. A seal member 40, preferably in the form of a resilient O-ring of rubber or the like, rests upon seat 32. The seal member is adapted to support and seal with a valve member 42, as suggested by FIG. 1, and for a reason to be explained presently.

The valve member 42, preferably in the form of a ball as shown, is mounted within the bore 30 of the body. If desired, a compression spring 44 may be provided, having the lower end thereof in engagement with the valve member 42, and the upper end of the spring in engagement with the undersurface of bushing 36. It is apparent that spring 44 will constantly urge the valve member 42 downwardly upon seal member 40 as illustrated in FIG. 1, to prevent flow of water from the manifold 10 through the bore of valve body 16.

Referring now to FIG. 2, the bacteriological trap according to the present invention is illustrated and is indicated generally by reference numeral 50. The trap includes an elongated hollow body 52 having a transverse inner wall 54 defining a chamber 56 within the lower portion of the body beneath the wall 54. The lower end of chamber 56 may be provided with an internal screw thread 58 which receives the threads formed on a plug 60 provided for closing off the lower end of the chamber. This plug 60 is adapted to compress a gasket member 62 between the plug and the body end, for providing a liquid-tight seal therebetween. It is apparent that this removable plug provides a means for readily gaining access to the chamber 56 for cleaning and inspection thereof when desired.

A threaded opening 64 is formed in the side wall of trap body 52, and is in communication with an intermediate portion of chamber 56. This threaded opening 64 constitutes a water outlet port, and provides a means for connecting an animal watering valve with the bacteriological trap.

The transverse wall 54 of the trap body 52 is provided with an opening 68 extending therethrough to receive a tubular member or delivery tube 70 suitably secured in place as by a press-fit. Tubular member 70 includes a longitudinally extending open-ended bore 72 formed therethrough, with a radially extending opening 74 being formed through the wall of the tubular member adjacent the upper end thereof.

The trap body 52 includes an upwardly extending annular skirt portion 80 disposed in surrounding relationship to the upper end of delivery tube or tubular member 70, and the inner surface of said skirt portion may be flared outwardly to form a shoulder 82 defining a socket 84 constituting the upper end of the body.

A bayonet slot indicated generally by reference numeral 88 may be provided in the annular wall of socket 84, the bayonet slot including a longitudinally extending portion 90 and a laterally extending portion 92. The bayonet slot is adapted to receive the pin 20 (FIG. 1) located on the quick-disconnect check valve body for detachably securing the bacteriological trap in place on the quick-disconnect check valve body 16.

Turning now to FIG. 3 of the drawings, the bacteriological trap 50 is indicated as being disposed in operative position on the quick-disconnect check valve body 16. In order to so connect the components, the bacteriological trap is advanced upwardly so that the tubular member 70 thereof passes through the bore 34 of the valve, to unseat the valve member 42 off of the seal member 40. In the operative relationship shown in FIG. 3, a fluid-tight seal is provided at 24 between the valve body 16 and the inner surface of skirt 80, but water may freely flow downwardly from the manifold, about the valve member 42, and thence downwardly through the opening 74 and bore 72 of the tubular member 70 into the chamber 56 of the trap.

The trap when advanced upwardly into the position shown in FIG. 3, may be slightly rotated with respect to the valve body 16, so as to lock the trap in position on the valve body by means of the bayonet connector mentioned.

It should be noted that in the operative position shown in FIG. 3, the O-ring 40 need not establish a fluid-tight seal about tube 70; in fact, it is desirable that tube 70 have a loose fit within O-ring 40, to avoid displacement of the ring from seat 32 when tube 70 is inserted to unseat valve member 42.

To remove the trap 50 for cleaning or inspection, it is necessary only to slightly rotate the trap body relative to valve body 16, in a proper direction to release the trap at the bayonet connection; then the trap may be bodily lowered and disassociated from the valve body. Such lowering of the trap results in withdrawal of tube 70 from port 34 and seal member 40, thereby permitting check ball 42 to cover seal member 40 and instantly prevent any flow of water from chamber 30 through port 34.

An animal watering valve arrangement is indicated generally by reference numeral 100, this animal watering valve being similar to that disclosed in copending U.S. patent application Ser. No. 597,089, filed Nov. 25, 1966 now Patent 3,385,267. The animal watering valve includes a valve cap 110 formed of a suitable corrosion resistant material such as brass, stainless steel, aluminum, or the like. The valve cap has a passageway extending axially therethrough, the passageway comprising a cylindrical bore 114 which joins with a substantially frustoconically shaped valve seat 116 having a plurality of spaced circumferential relatively sharp ridges formed thereon as described in the aforementioned U.S. patent application. This valve seat in turn communicates with a substantially cylindrical wall portion 118 defining a chamber therewithin. The inner end portion 120 of the valve cap is provided with threads on the outer surface thereof so that it may be threaded within the valve body hereinafter described.

A plunger indicated generally by reference numeral 130 includes an animal contact portion or nipple 132, and a relatively soft valve head 134. This valve head may be formed of a suitable elastomeric material such as 36 Duro buna-N rubber or the like which is adapted to deform under the force of water pressure applied thereto.

The value head includes a curved sealing surface which defines a portion of a spherical surface, this sealing surface being adapted to engage the value seat 116 previously described. As illustrated, the valve head is generally hemispherical in configuration. The valve head is suitably fastened as by bonding to the animal contact member or nipple, so as to prevent removal thereof by the forces encountered in normal use of the apparatus.

The animal contact member or nipple 132 is loosely received within the bore 114 of the valve cap, and the valve head is of such a dimension as to be loosely received within the chamber defined by wall portion 118 so that it can move back and forth therewithin. The valve head is of substantially greater dimension than the bore 114 in the valve cap.

A valve body indicated generally by reference numeral 140 may be formed of a material similar to the valve cap 110 and includes a recess at one end thereof, this recess being defined by a threaded side wall portion 142 and a bottom wall portion 144. The threaded side wall portion 142 is threadedly connected to the inner end of the valve cap, and a sealing gasket 146 formed of rubber or the like annular configuration is compressed between the inner end of the valve cap and the bottom wall 144 of the recess in the valve body.

A substantially axially extending bore or passageway 150 is formed longitudinally through the valve body 140 and opens through the wall portion 144. The valve body is provided with a threaded end portion 152 which is threaded within the threaded opening 64 provided in the side wall of the trap body 52. An integral hex head portion 154 is provided at an intermediate point on the valve body so that it can be readily manipulated by a wrench or similar tool.

The dimension of the valve head 134 is substantially greater than that of the passageway 150 formed in the valve body, and inner movement of the plunger is limited by interengagement of the value head with the surface 144 of the valve body, the components being so dimensioned that this interengagement will prevent the animal contact member 132 from leaving the bore portion 114 of the valve cap upon inward movement of the plunger. The animal contact member 132 is adapted to be urged inwardly by contact with an animal so as to unseat the valve head from the frusto-conical valve seat whereby water will flow freely around the valve head and the animal contact member through the outer end of the valve cap.

As set forth in the aforementioned copending U.S. patent application, the grusto-conical valve seat 116 should have an included angle of between about 50 and 90 degrees.

With the assembly in the position shown in FIG. 3 wherein the trap is installed in a vertical position, the trap can be readily removed from the quick-disconnect check valve at any time, since the valve member 42 will return to its seat as the trap is removed, to shut off the flow of water.

When the trap is in place on the quick-disconnect check valve body, water will flow downwardly through tubular member 70 and into chamber 56 until the air pressure within the chamber builds up to a point where it is equal to the manifold water pressure, whereupon the flow of water will cease.

When an animal for the first time opens the watering valve, air will escape, but this air is almost immediately replaced by water. As long as the watering valve is open, water will flow from the manifold downwardly through the quick-disconnect check valve and the tubular member 70 into the chamber 56, and thence out through the watering valve to the animal. When the animal stops drinking water, the watering valve will close and water will continue to flow through tubular member 70 until once again the air pressure within the chamber 56 equals the manifold water pressure. When this occurs, the water level in the chamber will be somewhat above the threaded opening 64 provided in the side wall of the trap, substantially as indicated by FIG. 3.

The distance that the water level rises above hole 64 depends on how much the manifold water pressure can compress the air in chamber 56. In general, the design is such that under any practical water pressures, the water level will not rise to the point where it comes into contact with the lower end of tubular member 70.

Accordingly, with the arrangement as illustrated in FIG. 3 an air gap is provided between the manifold and the animal watering valve during nonoperation of the apparatus. When the animal is drinking, water will pass downwardly through tubular member 70 either in drops or in a steady stream, depending upon the rate of consumption of the animal; but in any event, the velocity is such as effectively to prevent contaminating material from flowing in reverse fashion through the trap.

If the water within the trap should form a continuous film over the entire inner wall of the chamber 56, it is conceivable that certain types of contamination could flow in reverse through the device by traversing the path up the inner walls of the chamber, down the outside of the tubular member 70, and thence back up through the water column inside this tubular member. This eventuality, which is remote, may be effectively eliminated by coating the inside of the chamber with a water-repellant material such as Teflon, cellulose, or the like. Alternatively, the chamber might be lined with such material, or the body 52 may be so constructed that the chamber itself is defined by such material whereby water is prevented from forming a continuous film over the inner walls of the chamber.

If it is desired to examine and/or clean the trap, it is removed bodily from the quick-disconnect check valve as previously explained. Then the plug 60 may be removed therefrom whereupon the water in the chamber 56 can be dumped out; and the entire interior of the trap, which is cylindrical in contour, may be easily cleaned. After cleaning, the plug may be reinstalled in the trap and the trap again placed in operative position on the quick-disconnect valve, whereupon the conditions leading to formation of the air gap within the trap are automatically reestablished.

It is apparent from the foregoing that there is provided according to the present invention a novel quick-disconnect check valve which employs self-sealing means acting to prevent leakage of fluid when connected to a bacteriological trap, and also when the valve is connected with such a trap. The bacteriological trap of the present invention prevents contamination from passing from the animal watering valve back to the manifold either under the influence of gravity or under its own locomotion. Means may also be provided as above suggested, for effectively preventing the formation of a continuous film over the entire interior of the chamber of the trap. Means is provided also for readily cleaning out the trap when desired.

The assembly of the quick-disconnect check valve and the bacteriological trap according to the present invention is such that they may be easily connected and disconnected in a simple and effective manner. The diameter of the entire assembly is minimized and the overall assembly affords a relatively smooth unbroken external contour which will not accumulate or retain dirt and other foreign matter. The assembly is useful with any standard caps or nipples, and the entire assembly may be fabricated of materials capable of withstanding repeated sterilization in autoclaves. The overall design avoids formation of inaccessible or concealed chambers in which contamination can accumulate.

As this invention may be embodied in several forms without departing from the spirit or essential characteristics thereof, the present embodiment is therefore illustrative and not restrictive.

It is to be expressly understood that the animal watering valve 100 of FIG. 3 is disclosed by way of example only, and is therefore subject to considerable modification, or to replacement by other types of animal watering valves capable of performing the required service.

What is claimed is:

1. In a laboratory animal watering apparatus receiving water under modest pressure from a supply manifold, the combination which comprises: a supply valve communicatable with the manifold, said valve comprising a hollow body bored to provide a valve chamber having an outlet port at one end of the body; a valve seat surrounding said outlet port within the chamber; a shiftable valve member within the chamber to engage said seat; a bacteriological trap detachably connected to said supply valve body, said trap comprising an elongate body member having an axial bore extending therethrough defining an elongate upright air gap chamber having a closed lower end and an open upper end, said open upper end being of reduced size and substantially coaxial with said air gap chamber; said air gap chamber having a side outlet port disposed intermediate the ends of the air gap chamber defining a trap; a normally closed animal-actuated watering valve releasably inserted in fluid communication with the side outlet port aforesaid, and having means to be contacted by an animal to be watered; water delivery means carried by the trap body member and insertable through the outlet port of the supply valve body to unseat the valve member therein upon attachment of the trap body to the supply valve body, said delivery means being in the form of a tube delivering water from said supply valve to said air gap chamber when the shiftable valve member and the animal-actuated watering valve are open; the capacity of the air gap chamber and the location of the delivery tube therein being coordinated to produce an air gap between the delivery tube and the side outlet port of the air gap chamber whenever the animal-actuated watering valve is in closed condition.

2. Apparatus as specified by claim 1, wherein the delivery tube has an open upper end and an adjacent port, the the supply palve and effecting a seal with the shiftable member, and resilient means encircling the outlet port of the supply valve and effecting a seal with the shiftable valve member aforesaid.

3. Apparatus specified by claim 1, wherein is provided a fluid-tight seal at the detachable connection between the trap body and the body of the supply valve.

4. Apparatus as specified by claim 3, wherein the detachable connection is of a quick-discount type.

5. Apparatus as specified by claim 1, wherein is provided yieldable means constantly urging the shiftable valve member of the supply valve toward the valve seat thereof.

6. Apparatus as specified by claim 1, wherein is provided means to minimize formation of a water film between the delivery tube and the inner wall surface of the air gap chamber, the delivery tube being spaced from said inner wall surface along the major portion of its length within the chamber.

7. Apparatus as specified by claim 2, wherein the resilient means aforesaid is a single open ring shaped member supplying the seal for the shiftable valve member of the supply valve, the opening of said ring shaped member being receptive of the delivery tube.

8. Apparatus as specified by claim 6, wherein the lower end of the upright air gap chamber is normally closed by means of a displaceable closure member affording access to said chamber for purposes of cleaning and inspection.

References Cited

UNITED STATES PATENTS

| | | | |
|---|---|---|---|
| 2,486,729 | 11/1949 | Beckley | 119—72.5 |
| 2,678,630 | 5/1954 | Fredricksen | 119—75 |
| 2,873,051 | 2/1959 | Hamburg et al. | 222—396 |
| 3,215,119 | 11/1965 | Graham | 119—75 |

ALDRICH F. MEDBERY, *Primary Examiner.*